United States Patent
Kumar et al.

(10) Patent No.: US 6,878,362 B2
(45) Date of Patent: Apr. 12, 2005

(54) FUEL PROCESSOR APPARATUS AND METHOD BASED ON AUTOTHERMAL CYCLIC REFORMING

(75) Inventors: Ravi Vipperla Kumar, Irvine, CA (US); George N. Kastanas, Tarzana, CA (US)

(73) Assignee: General Electric Company, Schenectady, NY (US)

(*) Notice: Subject to any disclaimer, the term of this patent is extended or adjusted under 35 U.S.C. 154(b) by 262 days.

(21) Appl. No.: 10/116,126

(22) Filed: Apr. 5, 2002

(65) Prior Publication Data

US 2003/0190503 A1 Oct. 9, 2003

(51) Int. Cl.[7] ............................................. C01B 3/26
(52) U.S. Cl. ........................ 423/651; 252/373; 429/17; 422/190; 422/198; 422/206; 422/211
(58) Field of Search .................... 252/373; 423/651, 423/652, 655; 429/17; 422/190, 198, 206, 211

(56) References Cited

U.S. PATENT DOCUMENTS

| 5,339,754 A | 8/1994 | Lyon |
| 5,509,362 A | 4/1996 | Lyon |
| 5,827,496 A | 10/1998 | Lyon |
| 6,007,699 A | 12/1999 | Cole |

Primary Examiner—Stanley S. Silverman
Assistant Examiner—Maribel Medina
(74) Attorney, Agent, or Firm—Nixon & Vanderhye

(57) ABSTRACT

In a fuel processor based on autothermal cyclic reforming process, the fuel processor having a reformer, the reformer having two reactors with integrated heat exchangers, the two reactors cycling between a reforming step and a regeneration step, a method of generating hydrogen gas includes receiving a mixture of fuel and steam in the reformer reactor operating in a reforming step to produce hydrogen-rich reformate gas. The fuel is delivered from a fuel supply and the steam is generated by a heat recovery steam generator (HRSG). The reformate gas is fed to a shift reactor to reduce the concentration of carbon monoxide (CO) gas present in the reformate gas. Product gas generated by the shift reactor is received in a condenser to recover heat from the product gas. In one embodiment output gas stream from the condenser is supplied to a CO oxidizer to further reduce the CO concentration. The output gas stream from the CO oxidizer is supplied to an anode of a fuel cell, the fuel cell including a cathode for receiving ambient air to initiate an electrochemical reaction with the gas stream received by the anode. In another embodiment the output gas stream from the condenser is supplied to a Pressure Swing Adsorber (PSA). The output gas is high-purity hydrogen which can be utilized for industrial hydrogen or hydrogen vehicle refueling applications.

38 Claims, 5 Drawing Sheets

FUEL PROCESSOR APPARATUS AND METHOD BASED ON AUTOTHERMAL CYCLIC REFORMING

BACKGROUND OF THE INVENTION

This invention generally relates to methods and systems for generation of a hydrogen-rich stream, and more particularly to a fuel processor apparatus and method for generating a hydrogen-rich gas stream based on the autothermal cyclic reforming (ACR) process.

Fuel processors convert fossil fuels (such as natural gas and diesel fuel) or bio-fuels to either a hydrogen-rich gas for fuel cells or a pure hydrogen stream. The major subsystem of the fuel processor is the reformer. The reformer converts fuel to a reformate stream, which is a mixture of CO, $CO_2$, $H_2$, steam and hydrocarbons. The shift reactor is almost always used downstream of the reformer reactor. In the shift reactor, CO reacts with steam to produce $H_2$ and $CO_2$.

If the hydrogen-rich gas needs to be processed by a Proton Exchange Membrane (PEM) fuel cell, a CO oxidizer is used downstream of the shift reactor. The CO oxidizer utilizes air to oxidize most of the remaining CO to $CO_2$. If the hydrogen-rich gas needs to be processed by fuel cells other than PEM fuel cell the CO oxidizer is not required. If pure hydrogen needs to be generated, a Pressure Swing Adsorber (PSA) is usually used downstream of the shift reactor.

In prior art the following reforming processes are described: 1) Steam Reforming, 2) Partial Oxidation; 3) Autothermal Reforming; 4) Unmixed Reforming.

In chemical process industries, hydrogen is produced in large quantities using the steam reforming process—where the hydrocarbon fuel, typically natural gas, is reacted with steam in catalyst tubes. Because this reaction is endothermic, a furnace is required to transfer heat from another source, such as a fuel burner, to the catalyst tubes. Consequently, steam reforming is best suited for large chemical plants, which normally are more efficient at larger scales. At a smaller scale, an attractive alternative is autothermal cyclic reforming, which eliminates the requirement of the furnace.

Although various processes have been developed for generating hydrogen-rich gas stream for use in such applications as fuel cells, hydrogen vehicle refueling, and industrial use, each has its own drawbacks. The efficiency with which hydrogen-rich gas is generated by the present invention is far superior to that achieved by previous approaches, which involved heat transfer problems that likely lead to inefficiencies.

One example of an application found to have heat transfer problems is the industrial process known as steam reforming in which hydrogen is produced by passing steam and a hydrocarbon through a nickel catalyst. Steam reforming is typically done at temperatures in a range of 700° C. to about 1000° C. and at pressures in a range of about 1 to about 700 psig. These conditions are too severe for the use of reactor tubes made of mild steel or even stainless steel. A high nickel alloy such as Inconel must be used despite the great cost of such an alloy. Furthermore, heat must be supplied since the reaction is highly endothermic.

To avoid this disadvantage there have been proposals in the art for "adiabatic" steam reforming. In this approach, the heat necessary for the endothermic steam reforming reaction is provided by adding some air to the steam hydrocarbon mixture passing through the reactor. The oxygen in the air reacts with the hydrocarbon, liberating heat.

Unfortunately, however, combustion is an "all or nothing" process. If ignition does not occur, the needed heat is not liberated. If ignition does occur, heat is liberated not throughout the reactor where it is needed but at the point of ignition. Since the heat is not liberated uniformly throughout the reactor, there is again a severe heat transfer problem.

Heat transfer is also a substantial problem in other industrial processes in which packed bed reactors are used to carry out endothermic reactions. Examples of such reactions include but are not limited to the cracking of ammonia to make hydrogen/nitrogen mixtures, the gasification of biomass, the catalytic reforming of petroleum hydrocarbons, and the decomposition of methanol.

U.S. Pat. No. 5,827,496 describes the Unmixed Reforming or Autothermal Cyclic Reforming process which involves generation of a hydrogen rich-gas by cycling air and a mixture of fuel and steam. As explained in prior art, the ACR process includes a reforming step, an air regeneration step and a fuel regeneration step.

During the reforming step, fuel and steam react over the nickel catalyst to produce a reformate stream through conventional steam reforming chemistry. During this reforming step, calcium oxide is converted to calcium carbonate as it captures some of the $CO_2$ formed.

During the air regeneration step, air is passed through the packed bed to oxidize the nickel catalyst. The heat released by the oxidation reaction raises the temperature of the packed bed, and the calcium carbonate is decomposed back to calcium oxide.

During the fuel regeneration step, fuel is introduced to the packed bed, reducing the oxide form of the nickel catalyst back to its elemental form.

BRIEF DESCRIPTION OF THE INVENTION

The present invention provides fuel processing methods and systems based on the autothermal cyclic reforming process, for the generation of a hydrogen-rich stream from fossil fuels and bio-fuels. In one illustrative embodiment, the fuel processor generates a hydrogen-rich gas stream for use in stationary fuel cells. Another illustrative embodiment provides a method and system for producing high-purity hydrogen for use in hydrogen vehicle refueling and industrial hydrogen applications. The methods and systems as disclosed in exemplary embodiments of the present invention integrate various components of the fuel processor in a unique manner that result in systems with increased efficiency and lower capital costs over prior art approaches.

In an exemplary embodiment, the reformer consists of two reactors that cycle between the reforming and regeneration steps. The reformer reactor operating in the reforming step processes fuel and steam to produce a reformate, that is fed to a shift reactor for reducing carbon monoxide (CO) concentration. The feed from the shift reactor is processed and fed to a condenser for recovering heat from the shift reactor product gas. The shift reactor product gas after passing through the condenser is then fed to a CO oxidizer for further reducing the CO levels. The output gas stream from the CO oxidizer is then fed to the anode section of a fuel cell. The CO oxidizer is required only if the fuel cell used is a PEM fuel cell.

The reformer reactor operating in the regeneration step processes anode and cathode vent streams from the fuel cell to produce a vent gas that is supplied to a heat recovery steam generator or HRSG. A portion of the anode vent stream from the fuel cell is recycled back to the reformer reactor operating in the regeneration step while the remaining anode vent stream is recycled to an auxiliary burner on the HRSG.

In another exemplary embodiment, product gas from the reformer reactor operating in the regeneration step is used to preheat the feed gas to the reformer reactor operating in the regeneration step. The CO oxidizer is preferably interposed between first and second heat exchangers, each heat exchanger preferably including hot and cold sections. The product gas from the shift reactor is cooled using the first heat exchanger while the product gas from the CO oxidizer is cooled with the second heat exchanger. The cold sections of the first and second heat exchangers, respectively, are fed with cold water to generate a mixture of steam and water, which mixture is then supplied to the HRSG.

In yet another exemplary embodiment, the fuel cell of the present invention is replaced with a pressure swing adsorption (PSA) unit. The CO oxidizer is also usually eliminated in this exemplary embodiment. The off-gas (also referred to as "blow-down") from the PSA along with air is supplied to the reformer reactor operating in the regeneration step. The off-gas may also be recycled as fuel to the auxiliary burner on the HRSG.

One exemplary aspect the present invention provides in a fuel processor based on autothermal cyclic reforming process is, the fuel processor having a reformer, the reformer consists of two reformer reactors with integrated heat exchangers, the two reformer reactors cycling between a reforming step and a regeneration step, a method of receiving a mixture of fuel and steam in the reformer reactor operating in the reforming step to produce a hydrogen-rich reformate gas. The reformate gas is supplied to a shift reactor to reduce the concentration of carbon monoxide (CO) gas present in the reformate gas. Product gas generated by the shift reactor is preferably received in a condenser to recover heat from the product gas. The output gas stream from the condenser is supplied to a CO oxidizer to further reduce CO concentration, and CO oxidizer output is provided to a fuel cell for generating electricity.

The fuel cell preferably includes anode and cathode sections, the CO oxidizer output being provided to the anode. Ambient air is supplied to the cathode. A portion of a vent stream from the anode and a portion of vent stream from the cathode are supplied to the reformer reactor operating in the regeneration step to produce vent gas which is fed to the HRSG.

The anode and cathode vent streams are preferably passed through the condenser before being received by the reformer reactor in the regeneration step. The anode and cathode vent streams are mixed, or cycled alternately, or a combination thereof. The remainder of the anode vent stream is provided to an auxiliary burner associated with the HRSG to produce additional heat to generate steam. The auxiliary burner is also supplied with air for enabling the HRSG to generate steam. Each integrated heat exchanger enables transfer of heat from a product gas output by respective reformer reactor to a feed gas to the respective reformer reactor. The integrated heat exchanger preferably reduces the temperature of the product gas from about 700–1000 degrees C. to about 200–700 degrees C., thereby recovering heat from the product gas.

The shift reactor preferably reduces the concentration of CO in the reformate stream to less than 2%. The reformate stream feeding into the shift reactor may be mixed with steam from the HRSG, and liquid water from an external source to increase the steam content as well as to reduce the temperature of the reformate stream. The fuel supplied to reactor in the reforming step includes natural gas, propane, gasoline, diesel, naphtha, or other hydrocarbon based fuels, landfill gas, bio-gas, or other bio-fuels and the reformate stream generated by the reactor in the reforming step includes a mixture of hydrogen, carbon monoxide (CO), carbon dioxide, steam, and hydrocarbons.

Another exemplary aspect of the present invention provides a fuel processor based on autothermal cyclic reforming process for generating a hydrogen-rich gas, the apparatus including two reformer reactors with integrated heat exchangers, the two reformer reactors cycling between a reforming step and a regeneration step. A heat recovery steam generator (HRSG) is provided for generating steam which is mixed with fresh fuel, and the mixture is delivered to the reformer reactor in the reforming step to produce a hydrogen-rich reformate gas. A shift reactor is provided for receiving the reformate gas to reduce the concentration of carbon monoxide (CO) gas present in the reformate gas. A condenser is provided for receiving the shift reactor product gas to recover heat from the shift reactor product gas. A CO oxidizer is provided for receiving output gas stream from the condenser to further reduce the concentration of the CO in the condenser output gas stream. Also provided in the apparatus is a fuel cell having anode and cathode sections, the anode section receiving gas stream output by the CO oxidizer, and the cathode section receiving ambient air.

The fuel processor also includes an auxiliary burner associated with the HRSG, the burner receiving the remainder of the anode vent stream to produce additional heat to generate steam. The integrated heat exchanger reduces the temperature of the product gas from about 700–1000 degrees C. to about 200–700 degrees C., thereby recovering heat from the product gas. The shift reactor reduces the concentration of CO in the reformate stream to less than 2%.

In yet another exemplary aspect, the present invention provides in a fuel processor based on autothermal cyclic reforming process, the processor having two reformer reactors with integrated heat exchangers. The two reformer reactors cycle between a reforming step and a regeneration step. A method of generating hydrogen gas includes receiving a mixture of fuel and steam in the reformer reactor operating in the reforming step to produce a hydrogen-rich reformate gas. The reformate gas is fed to a shift reactor to reduce the concentration of carbon monoxide (CO) present in the reformate gas. Product gas from the shift reactor is received in a condenser to recover heat from the product gas, and output gas from the condenser is supplied to a pressure swing adsorption (PSA) unit for generating high-purity hydrogen. A portion of the off-gas from the PSA unit is preferably supplied to the reformer reactor operating in the regeneration step through a condenser. The condenser heats the PSA off-gas.

In another non-limiting exemplary aspect, the invention provides a fuel processor based on the autothermal cyclic reforming process for generating hydrogen-rich gas, the apparatus comprises two reformer reactors with integrated heat exchangers, the two reformer reactors cycling between a reforming step and a regeneration step. A heat recovery steam generator (HRSG) is provided for generating steam. The reformer reactor in the reforming step preferably receives the steam from the HRSG and fuel from an external source for producing a hydrogen-rich reformate gas.

A shift reactor is provided for reducing the concentration of carbon monoxide (CO) present in the reformate gas. A CO oxidizer is preferably interposed between first and second heat exchangers, each of the first and second heat exchangers including a hot section and a cold section, wherein product gas from the shift reactor is received in the hot section of the first heat exchanger for recovering heat, and output gas stream from the first heat exchanger is delivered to the CO oxidizer to reduce the concentration of CO in the output gas stream from the first heat exchanger. Each of the first and second heat exchangers preferably receive liquid water from an external source to generate a mixture of steam and water, the mixture being delivered to the HRSG.

The fuel processor apparatus further includes a fuel cell having an anode and a cathode, the anode receiving the output gas stream from the second heat exchanger, and the cathode receiving ambient air to initiate an electrochemical reaction with the gas stream received by the anode. The fuel processor apparatus further includes a third heat exchanger having hot and cold sections, the cold section of the third heat exchanger receiving a portion of anode and cathode vent streams.

In a further exemplary and non-limiting aspect, the present invention provides in a fuel processor based on autothermal cyclic reforming process, the processor having two reformer reactors with integrated heat exchangers, the two reactors cycling between a reforming step and a regeneration step, a method of generating hydrogen including receiving a mixture of fuel and steam in the reformer reactor operating in a reforming step to produce a hydrogen-rich reformate gas. The reformate gas is fed to a shift reactor to reduce the concentration of carbon monoxide (CO) gas present in the reformate. A CO oxidizer is interposed between a first and second heat exchangers, each of the first and second heat exchangers including a hot section and a cold section. Product gas generated by the shift reactor is received in the hot section of the first heat exchanger for recovering heat, and output gas stream from the first heat exchanger is delivered to the CO oxidizer to reduce the concentration of CO.

Liquid water is supplied to the cold section of each of the first and second heat exchangers to generate a mixture of steam and water. The mixture of steam and water is then delivered to the HRSG. Output gas stream from the CO oxidizer is supplied to the hot section of the second heat exchanger for recovering heat from gas stream output from the CO oxidizer, and output gas stream from the second heat exchanger is supplied to an anode of a fuel cell, the fuel cell including a cathode for receiving ambient air to initiate an electrochemical reaction with the gas stream received by the anode.

The method further includes delivering a portion of anode and cathode vent streams to a cold section of a third heat exchanger; delivering product gas from the reformer reactor operating in the regeneration step to the third heat exchanger to preheat the anode and cathode vent streams received by the third heat exchanger; and delivering preheated anode and cathode vent streams to the reformer reactor the regeneration step.

DETAILED DESCRIPTION OF THE INVENTION

The benefits of the present invention will become apparent to those skilled in the art from the following detailed description, wherein a preferred embodiment of the invention is shown and described, simply by way of illustration of the best mode contemplated of carrying out the invention.

Figure 1:
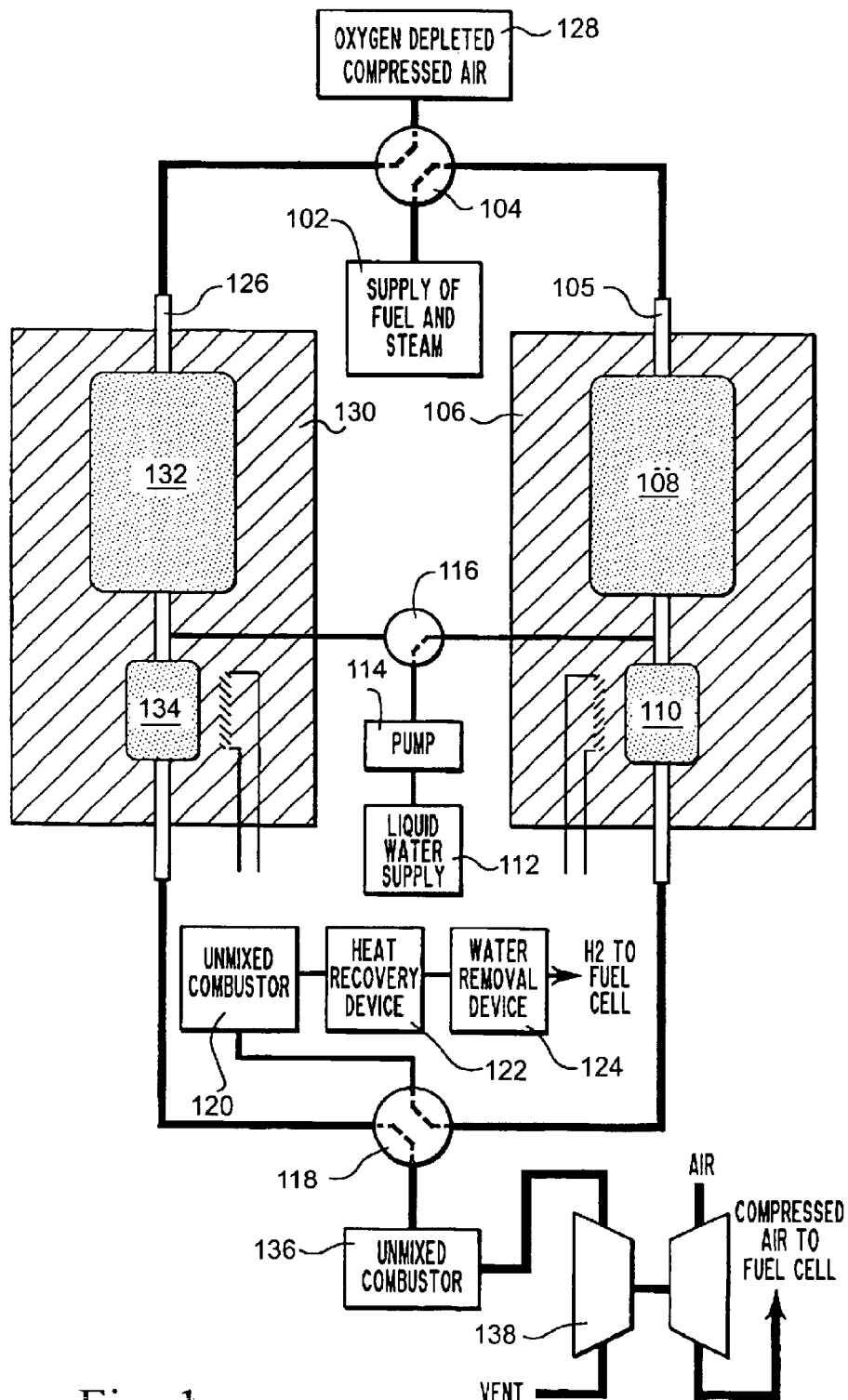
FIG. 1 shows a prior art reactor system for producing a hydrogen-rich stream for use in fuel cells using an autothermal cyclic reformer process.

FIG. 1 shows a packed bed reactor system 100, using the ACR process, for producing a hydrogen-rich stream for use in fuel cells. The packed bed reactor system of FIG. 1 includes a supply 102 provides a flowing stream of steam and a liquid or gaseous hydrocarbon at a pressure greater than about 60 psig to a four-way valve 104. The four-way valve directs this flowing gas stream into the top of a reactor 105. Reactor 105 is covered with insulation 106 and has a main section 108 and a smaller section 110. Both main section 108 and smaller section 110 contain a mixture of two catalysts.

Conditions are adjusted so that the temperature in a main section 108 is in a range from about 600° C. to about 800° C. The steam and hydrocarbon react to form hydrogen through an endothermic chemical reaction. As the impure hydrogen leaves main section 108, liquid water from a liquid water supply 112 is added to it via a pump 114 and a three-way valve 116. The evaporation of this liquid water cools the impure hydrogen and maintains a temperature in smaller section 110 less than about 600° C. and most preferably in a range from about 200° C. to about 550° C.

The impure hydrogen is purified as it passes through smaller section 110. The purified hydrogen exits reactor 105 via a second four-way valve 118, passing through an unmixed combustor 120, a heat recovery device 122, and a water removal device 124. The purified hydrogen then goes to a fuel cell.

Compressed air is provided to the cathode side of the fuel cell. The gas flowing away from the cathode side of a fuel cell has a nonzero oxygen content but, as compared to air, is depleted of oxygen. Thus, the fuel cell is provided oxygen depleted compressed air 128. This oxygen depleted air passes through four-way valve 104 to second reactor 126. Second reactor 126 is covered with insulation 130 and has a main section 132 and a smaller section 134.

The heat released by oxidizing the unmixed combustion catalyst with the oxygen-depleted compressed air is also retained by the oxygen-depleted compressed air. The oxygen depleted compressed air is further heated by oxidizing any residual gases containing molecular hydrogen with an additional unmixed combustion catalyst in the unmixed combustor 136 and then expanding it by passing it through a gas turbine such as a turbo-expander 138 to generate power. The generated power drives a turbo-compressor to produce compressed air.

When the reactions are completed, four-way valves 104 and 118 and three-way valve 116 all switch. Further, when the valve switch occurs, reactor 105 contains hydrogen gas. The oxygen depleted air forces the hydrogen out of reactor 105 through four-way valve 118 and through unmixed combustor 136 to turbo-expander 138. As the hydrogen passes through unmixed combustor 136, it is oxidized to water. The heat thus produced increases the ability of turbo-expander 138 to do work. Similarly, when the valves switch, reactor 126 contains oxygen depleted air. The steam and hydrocarbon entering reactor 126 forces the oxygen-depleted air out of reactor 126 through four-way valve 118 and through unmixed combustor 120.

While the oxygen depleted air still contains some oxygen, the amount of this oxygen is, on a time average basis, small relative to the amount of hydrogen passing through unmixed combustor 120. The heat produced by the reduction of this small amount of oxygen is added to the heat which heat recovery device 122 can recover. The removal of this small amount of oxygen by unmixed combustor 120 purifies the hydrogen going to the fuel cell.

Figure 2:
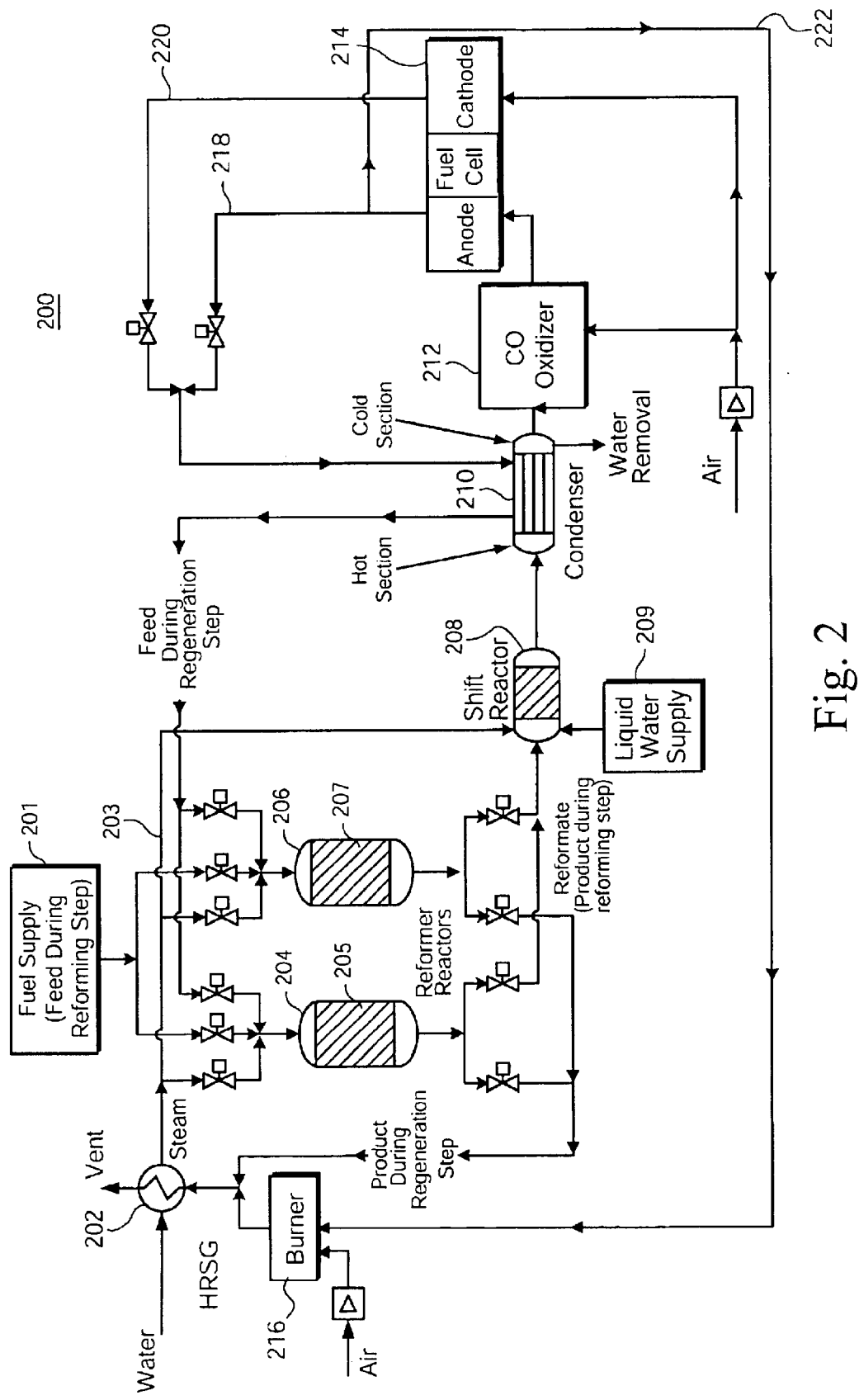
FIG. 2 is a schematic view disclosing the integration of autothermal cyclic reformer with a fuel cell in an exemplary illustrative embodiment of the present invention.

FIG. 2 shows an exemplary illustrative embodiment of the present invention disclosing the details of a fuel processor and integration of autothermal cyclic reformer with a fuel cell. The fuel processor 200 includes reformer reactors 204, 206 which cycle between a reforming step and a regeneration step, i.e., when one reactor is processing fuel feed and steam during a reforming step, the other reactor is processing feed during a regeneration step. For example, if reactor 204 is performing a reforming step, the other reactor 206 is performing a regeneration step, and vice-versa. The process of cycling between reforming and regeneration steps is similar to the cycling steps set forth with respect to FIG. 1 and are therefore not repeated herein. It will, however, be appreciated that the integration of various components of the fuel processor is substantially different and novel over FIG. 1.

Cyclic valves 203 direct feed streams (e.g., fuel feed during reforming step) and product streams (e.g., feed during regeneration step) between reactors 204 and 206, respectively. Each of the reformer reactors 204, 206 are loaded with catalysts and include an integrated heat exchanger for transferring heat from the product gas from a respective reactor to the feed gas to the same reactor. Heat exchangers 205, 207 typically reduce the temperature of the product gas from about 700–1000 degrees C. to about 200–700 degrees C., thus recovering the heat. Alternatively, if high temperature cyclic valves 203 are used, the integrated heat exchangers may be eliminated from the reformer reactors.

The operation of the fuel processor 200 described herein is based on the reactor 204 operating in a reforming step while the reactor 206 being operating in a regeneration step. It will, however, be appreciated that, when the reactor 204 cycles to operate in the regeneration step, the reactor 206 switches to operate in the reforming step. The cycling process of the reformer reactors 204 and 206 are similar to the cycling of reactors 132 and 108 of FIG. 1.

Steam from HRSG 202 and the fuel from fuel supply 201 are mixed and supplied to reactor 204, assuming that it is operating in the reforming mode. Typically, in a reforming step, fuel and steam are processed to produce a reformate, and in a regeneration step, unreacted fuel that is recycled is flowing. The reformate stream is a mixture of hydrogen, carbon monoxide (CO), steam, and hydrocarbons. The fuel supplied from fuel supply 201 may be, for example, natural gas, propane, gasoline, diesel fuel, naphtha, and other hydrocarbon-based fuels or bio-fuels. The steam is generated by a heat recovery steam generator or HRSG 202 with an auxiliary burner 216. Reformate produced by reactor 204 is fed to a shift reactor 208.

Reactor 206, which is operating in a regeneration step, processes feed during the regeneration step and produces a product during such a regeneration step which is fed to the HRSG 202. The product generated during the regeneration step by reactor 206 is fed to the HRSG to recover the heat from the product for generating steam. Reactor 206 processes anode and cathode vent streams from fuel cell 214 to produce a vent gas. The vent gas is then fed to the HRSG 202. Fresh fuel may also be used instead of the anode vent stream, and fresh air may be used instead of cathode vent stream. The vent gas may be directed to the ambient instead of directing it to the HRSG 202.

The shift reactor 208 reduces the concentration of CO in the reformate stream, received from reactor 204, to less than about 2% (on a dry basis). The feed gas to the shift reactor 208 is mixed with steam from the HRSG 202, and liquid water from water supply 209 in order to reduce the temperature of the gas as well as to increase the steam content of the reformate stream. The product gas from the shift reactor is passed to the hot side of a condenser/heat-exchanger 210. The condenser/heat-exchanger 210 reduces the temperature of the product gas, before it is received by the Co oxidizer 212. The moisture content of the product gas from the shift reactor 208 may be reduced using the condenser/heat-exchanger 210. Heat is thus removed from the shift reactor product gas.

The hydrogen-rich gas from the shift reactor 208, and received in the condenser 210, is then fed to a CO oxidizer 212 along with air. The CO oxidizer reduces the concentration of CO, while about less than 2% of hydrogen is oxidized. The product gas from CO oxidizer 212 is fed to the anode side of the fuel cell 214. Anode vent gas and cathode vent gas from the fuel cell 214 are passed through the cold side of the condenser. Fresh fuel can be used instead of anode vent gas. Fresh air can be used instead of cathode vent gas. A portion of the anode vent stream from the fuel cell 214 is recycled back to reactor 206, via loop 218, that is in the regeneration step. The remaining anode vent stream is recycled to the auxiliary burner 216 on the HRSG 202 via loop 222. The cathode vent stream from the fuel cell 214 may either be directed to reactor 206, in the regeneration step, or to the atmosphere, or a combination of both.

Additional air may be fed to the burner 216 before the HRSG. The burner 216 generates the heat necessary to produce the steam for the reforming step. The unreacted oxygen flowing out of the cathode is fed via loop 220, and recycled back to the condenser 210 from where it is recycled back to reactor 206 during the regeneration step.

Figure 3:
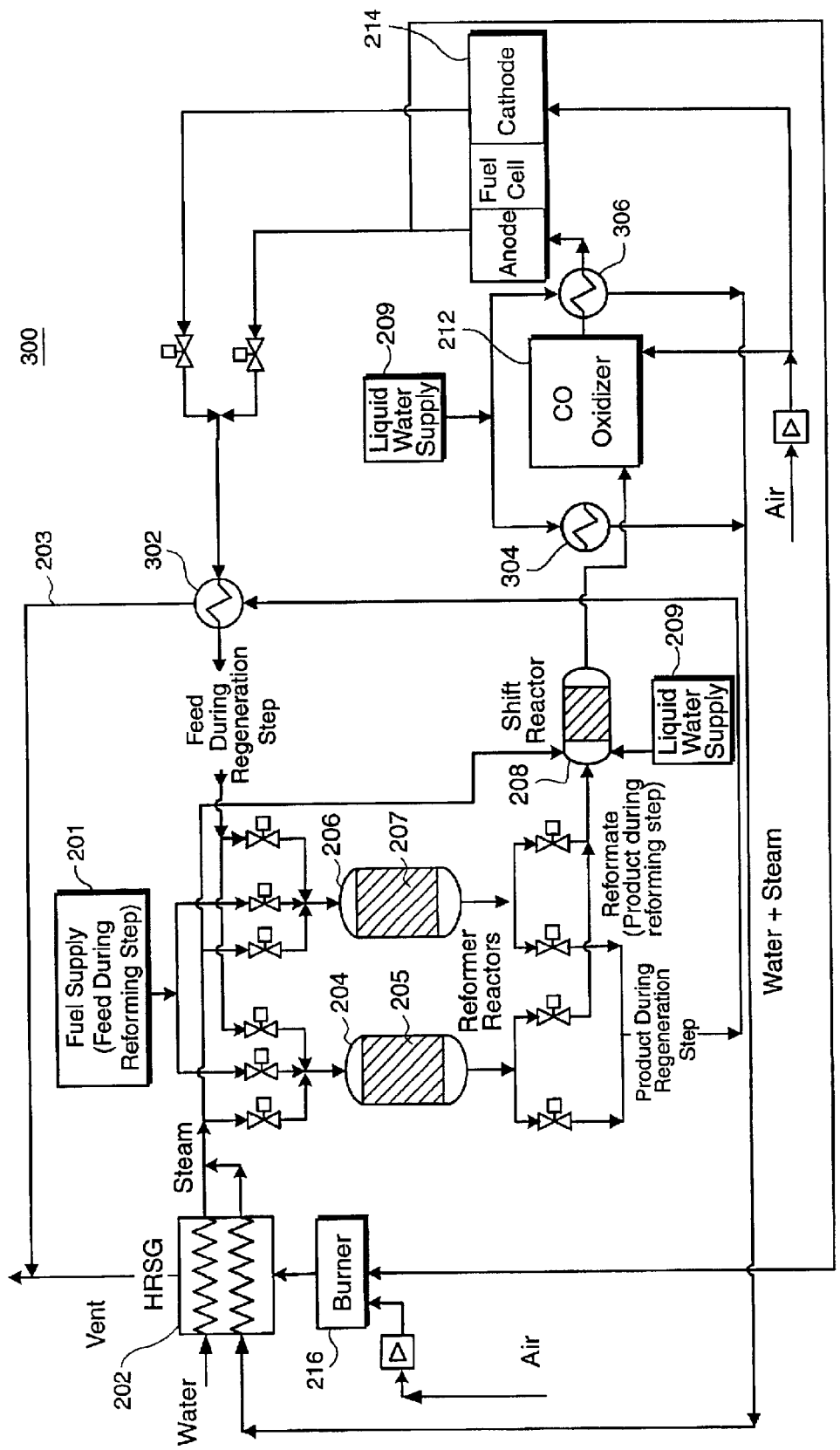
FIG. 3 is a schematic view disclosing the integration of autothermal cyclic reformer with a fuel cell in another exemplary embodiment of the present invention.

FIG. 3 shows another embodiment of the present invention wherein like elements are identified with like numerals. The embodiment shown in FIG. 3 includes heat exchangers 302, 304 and 306, each exchanger having a hot side and a cold side.

In contrast to FIG. 2 where pure water is fed to the HRSG 202 to generate steam, the embodiment of FIG. 3 uses a mixture of liquid water and steam from heat exchangers 304 and 306 for feeding to the HRSG 202.

In contrast to FIG. 2 where the shift reactor 208 outlet gas is used to preheat the gas stream supplied to the reformer reactor in the regeneration step, in FIG. 3 the product gas from the reformer reactor 206 in the regeneration step is used to preheat the feed gas to the reformer reactor 206 in the regeneration step using heat exchanger 302.

Product from the regeneration step is fed to a heat exchanger 302 (i.e., product flowing into the hot side of 302). On the cold side, feed during regeneration step (i.e., coming from the fuel cell) flows into reactor 206, via heat exchanger 302 and received by the reformer reactor 206, to become the product during the regeneration step, unlike in FIG. 2, where the product during regeneration step flows into HRSG 202.

The product gas from the shift reactor 208 is cooled by utilizing a heat exchanger 304. The product gas from the CO oxidizer 212 may also be cooled with a heat exchanger 306. The cold side of heat exchangers 304, 306 is fed with liquid water from water supply 209 to generate a mixture of steam and water which is fed to the HRSG 202.

Figure 4:
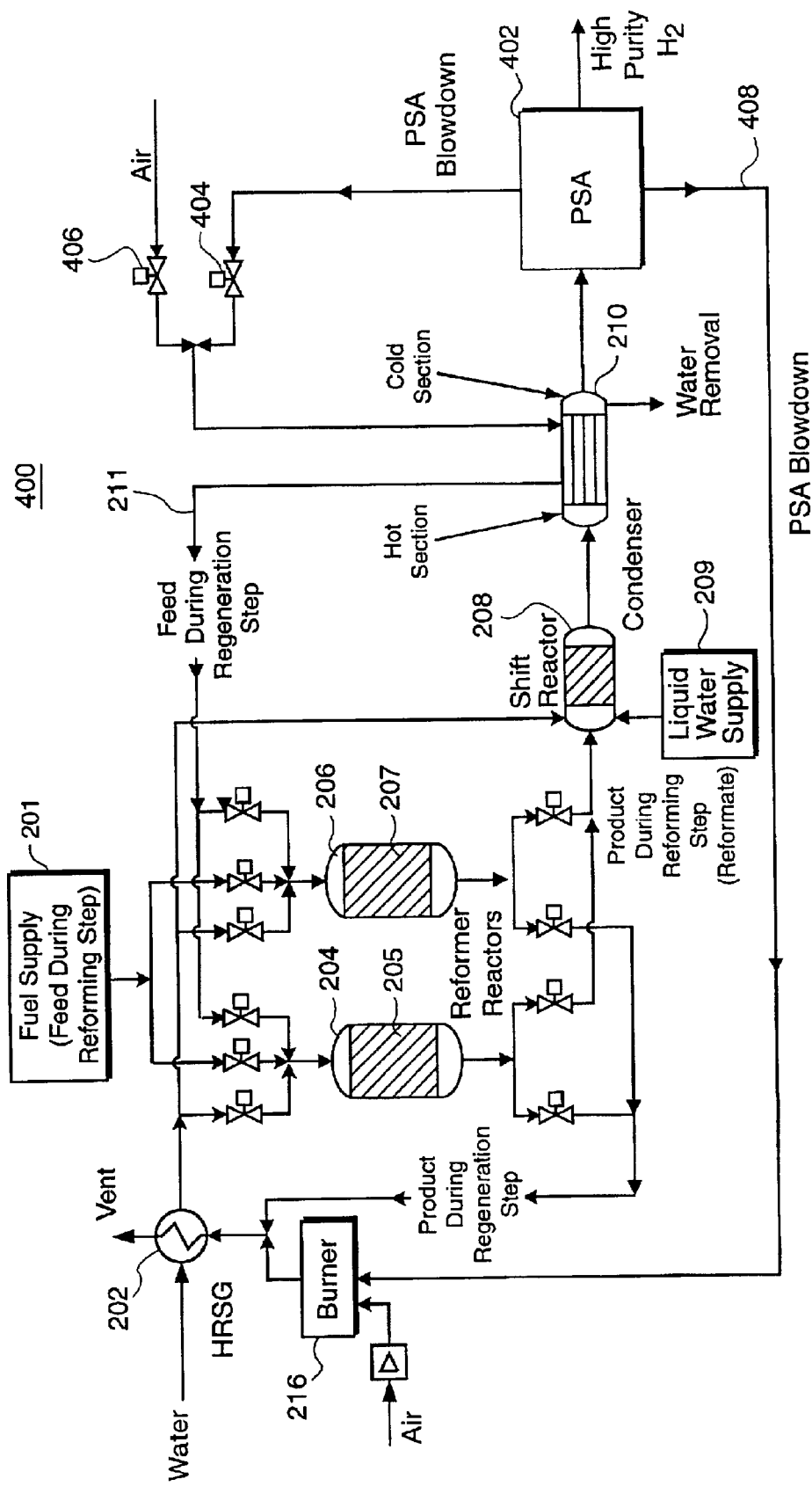
FIG. 4 is a schematic view illustrating the integration of autothermal cyclic reformer for pure hydrogen generation in another exemplary embodiment of the present invention.

FIG. 4 shows another embodiment of the present invention, for use in high-purity hydrogen applications. In this figure, like elements are identified with like numerals. The product from the condenser/heat exchanger 210 is received by a Pressure Swing Adsorption (PSA) unit 402, which further purifies the hydrogen stream received from condenser 210. For example, hydrogen received from the condenser may be purified to about 98% purity level by the PSA. The off-gas, i.e., the blow-down, from the PSA 402 flowing through valve 404 and ambient air received via inlet 406, are sent to the reformer reactor 206 in the regeneration step via condenser 210 and feedback loop 211. The high purity hydrogen output from the PSA may be fed to a fuel cell or could be used for hydrogen vehicle refueling applications or could be used for industrial hydrogen. The PSA off-gas may also be recycled, via path 408, as fuel to the auxiliary burner 216 on the HRSG 202.

For proper operation, the PSA 402 typically requires the feed pressure to be at greater than 50 psig. The pressure of the feed gas to the PSA 402 is maintained at greater than 50 psig by feeding fuel and steam to the reformer reactor 204 at a pressure above 50 psig, or by operating the reformer reactor 204 at low pressure and using a compressor (not shown) to compress the gas, from the condenser 210, to above 50 psig.

Figure 5:
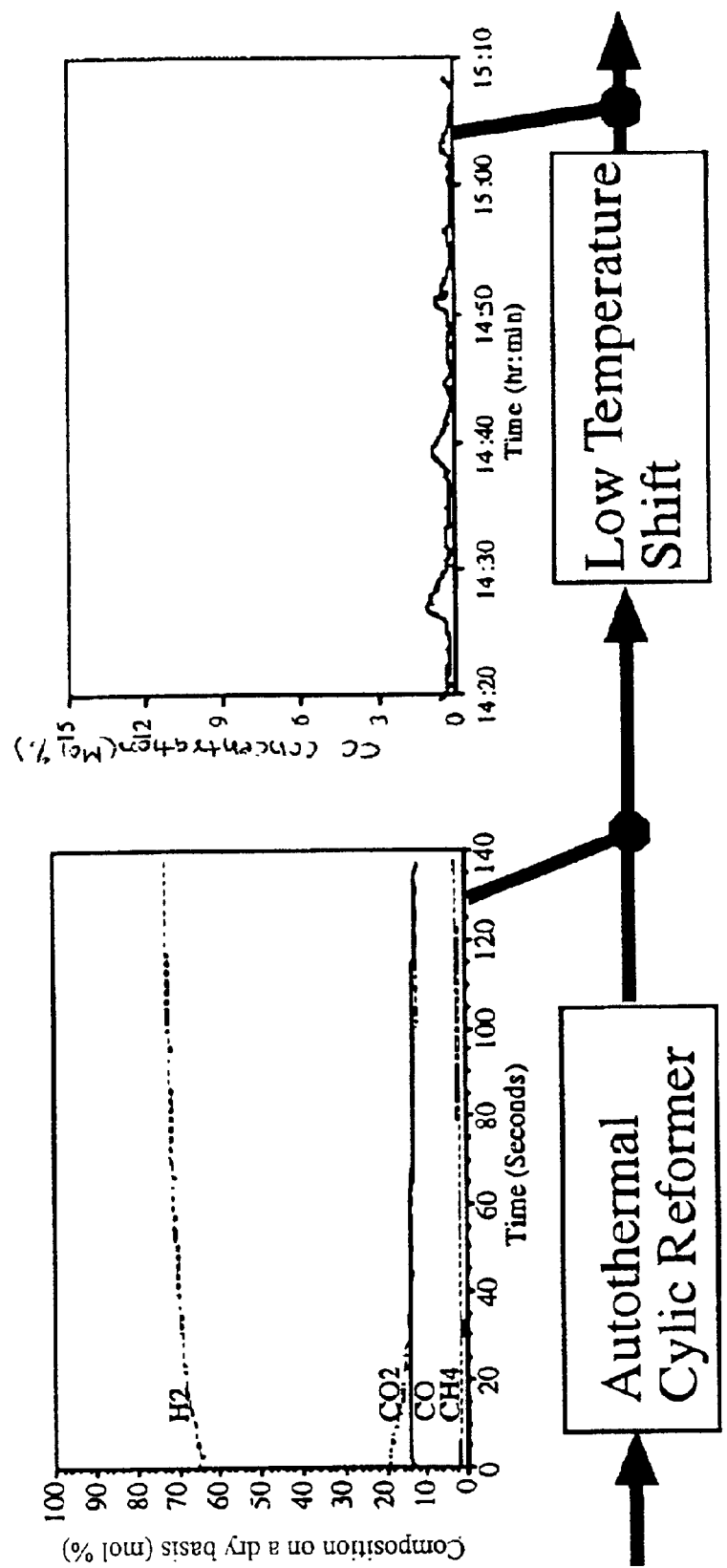
FIG. 5 is a chart illustrating the gas composition of the product stream from the reformer (reformate) and the product stream from a low temperature shift reactor.

FIG. 5 is a chart illustrating the gas composition of the product stream (i.e., reformate) from the reformer reactor 204 (in FIGS. 2–4) and the product stream from a low-temperature shift reactor 208 (in FIGS. 2–4). As shown in FIG. 5, the reformer reactor produces a reformate with CO concentration less than 20% and the shift reactor produces a CO stream with CO concentration less than 2%.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a fuel processor based on autothermal cyclic reforming process, said processor having two reformer reactors with integrated heat exchangers, said two reactors cycling between a reforming step and a regeneration step, a method of generating hydrogen gas comprising:
   receiving a mixture of fuel and steam in said reformer reactor operating in a reforming step to produce a hydrogen-rich reformate gas;
   supplying the reformate gas to a shift reactor to reduce the concentration of carbon monoxide (CO) gas present in the reformate gas;
   receiving product gas generated by the shift reactor in a condenser to recover heat from the product gas;
   flowing output gas stream from the condenser to a CO oxidizer to further reduce CO concentration; and
   providing CO oxidizer output to a fuel cell for generating electricity.

2. The method as in claim 1, wherein the fuel cell includes anode and cathode sections, the CO oxidizer output is provided to the anode and ambient air is supplied to the cathode for initiating electrochemical reaction, the method further includes:
   flowing a portion of a vent stream from the anode and a vent stream from the cathode to the reformer reactor operating in the regeneration step to produce vent gas; and
   feeding the vent gas to an HRSG.

3. The method as in claim 2, wherein the anode and cathode vent streams are passed through the condenser before being received by the reformer reactor in the regeneration step.

4. The method as in claim 2, further comprising:
   flowing a remainder of the anode vent stream to an auxiliary burner associated with the HRSG to produce additional heat to generate steam.

5. The method as in claim 4, further comprising:
   feeding air to the auxiliary burner for enabling the HRSG to generate steam.

6. The method as in claim 1, wherein the integrated heat exchanger enables transfer of heat from a product gas output by respective reformer reactors to a feed gas to the respective reformer reactor.

7. The method as in claim 6, wherein the integrated heat exchanger reduces the temperature of the product gas from about 700–1000 degrees C. to about 200–700 degrees C., thereby recovering heat from the product gas.

8. The method as in claim 1, wherein the shift reactor reduces the concentration of CO in the reformate stream to less than 2%.

9. The method as in claim 1, wherein the reformate stream feeding into the shift reactor is mixed with steam from an HRSG, and liquid water from an external source to increase the steam content and to reduce the temperature of the reformate stream.

10. The method as in claim 1, wherein the fuel supplied to the reformer reactor in the reforming step comprises natural gas, propane, gasoline, diesel, naphtha, or other hydrocarbon based fuels and landfill gas, biogas or other bio-fuels.

11. The method as in claim 1, wherein the reformate stream generated by the reformer reactor in the reforming step comprises a mixture of hydrogen, carbon monoxide (CO), carbon dioxide, steam, and hydrocarbons.

12. A fuel processor based on autothermal cyclic reforming process for generating hydrogen, the apparatus comprising:
   two reformer reactors with integrated heat exchangers, said two reformer reactors cycling between a reforming step and a regeneration step;
   a heat recovery steam generator (HRSG) for generating steam, said steam being mixed with fresh fuel and delivered to the reformer reactor operating in a reforming step to produce a hydrogen-rich reformate gas;
   a shift reactor receiving the reformate gas to reduce the concentration of carbon monoxide (CO) gas present in the reformate gas to produce shift reactor product gas;
   a condenser receiving the shift reactor product gas to recover heat from the shift reactor product gas;
   a CO oxidizer receiving output gas stream from the condenser to further reduce the concentration of the CO in the condenser output gas stream; and
   a fuel cell having anode and cathode sections, the anode section receiving gas stream output by the CO oxidizer, and the cathode section receiving ambient air to initiate an electrochemical reaction with the gas stream received by the anode.

13. The fuel processor apparatus as in claim 12, wherein a portion of a vent stream from the anode and a vent stream from the cathode are supplied to the reformer reactor operating in the regeneration step to produce vent gas, and the vent gas is supplied to the HRSG.

14. The fuel processor as in claim 12, wherein the anode and cathode vent streams are passed through the condenser before being received by the reformer reactor in the regeneration step.

15. The fuel processor apparatus as in claim 13, further comprising:
an auxiliary burner associated with the HRSG, said burner receiving a remainder of the anode vent stream to produce additional heat to generate steam.

16. The fuel processor apparatus as in claim 15, wherein the auxiliary burner is supplied with air for enabling the HRSG to generate steam.

17. The fuel processor apparatus as in claim 12, wherein each integrated heat exchanger enables transfer of heat from a product gas output by respective reformer reactors to a feed gas to the respective reformer reactors.

18. The fuel processor apparatus as in claim 17, wherein the integrated heat exchanger reduces the temperature of the product gas from about 700–1000 degrees C. to about 200–700 degrees C., thereby recovering heat from the product gas.

19. The fuel processor apparatus as in claim 12, wherein the shift reactor reduces the concentration of CO in the reformate stream to less than 2%.

20. The fuel processor apparatus as in claim 12, wherein the reformate stream feeding into the shift reactor is mixed with steam from the HRSG, and liquid water from an external source to increase the steam content and to reduce the temperature of the reformate stream.

21. The fuel processor apparatus as in claim 12, wherein the fuel supplied to the first reactor comprises natural gas, propane, gasoline, diesel, naphtha, or other hydrocarbon based fuels and bio-fuels.

22. The fuel processor apparatus as in claim 12, wherein the reformate stream generated by the reformer reactor in the reforming step comprises a mixture of hydrogen, carbon monoxide (CO), carbon dioxide, steam, and hydrocarbons.

23. In a fuel processor based on autothermal cyclic reforming process, said processor having two reformer reactors with integrated heat exchangers, said two reformer reactors cycling between a reforming step and a regeneration step, a method of generating hydrogen gas comprising:
receiving a mixture of fuel and steam in said reformer reactor operating in a reforming step, said fuel delivered from a fuel supply and said steam generated by a heat recovery steam generator (HRSG), to produce a hydrogen-rich reformate gas;
feeding the reformate gas to a shift reactor to reduce the concentration of carbon monoxide (CO) gas present in the reformate gas to produce shift reactor product gas;
interposing a CO oxidizer between a first and second heat exchangers, each of said first and second heat exchangers including a hot section and a cold section;
receiving the shift reactor product gas in the hot section of the first heat exchanger for recovering heat, and delivering output gas stream from the first heat exchanger to the CO oxidizer to reduce the concentration of CO in the output gas stream from the first heat exchanger;
supplying water to the cold section of each of said first and second heat exchangers to generate a mixture of steam and water;
delivering the mixture of steam and water to the HRSG;
supplying output gas stream from the CO oxidizer to the hot section of the second heat exchanger for recovering heat from gas stream output from the CO oxidizer; and
supplying output gas stream from the second heat exchanger to an anode of a fuel cell, the fuel cell including a cathode for receiving ambient air to initiate an electrochemical reaction with the gas stream received by the anode.

24. The method as in claim 23, further comprising:
delivering a portion of anode and cathode vent streams to a cold section of a third heat exchanger;
delivering product gas from the reformer reactor operating in a regeneration step to the third heat exchanger to preheat the anode and cathode vent streams received by the third heat exchanger; and
delivering preheated anode and cathode vent streams to the reformer reactor in the regeneration step.

25. The method as in claim 24, further comprising:
supplying a portion of the anode and cathode vent streams to an auxiliary burner associated with the HRSG.

26. The method as in claim 25, wherein the auxiliary burner is supplied with ambient air.

27. A fuel processor based on autothermal cyclic reforming process for generating hydrogen, the apparatus comprising:
two reformer reactors with integrated heat exchangers, said two reformer reactors cycling between a reforming step and a regeneration step;
a heat recovery steam generator (HRSG) for generating steam, said reformer reactor in the reforming step receiving the steam from the HRSG and fuel from an external source for producing a hydrogen-rich reformate gas, and wherein said reformer reactor operating in a reforming step;
a shift reactor for reducing the concentration of carbon monoxide (CO) present in the reformate gas;
a CO oxidizer interposed between a first and second heat exchangers, each of said first and second heat exchangers including a hot section and a cold section, wherein product gas from the shift reactor is received in the hot section of the first heat exchanger for recovering heat, and output gas stream from the first heat exchanger is delivered to the CO oxidizer to reduce the concentration of CO in the output gas stream from the first heat exchanger; and
a fuel cell having an anode and a cathode, the anode receiving the output gas stream from the second heat exchanger, and said cathode receiving ambient air to initiate an electrochemical reaction with the gas stream received by the anode.

28. The fuel processor as in claim 27, further comprising:
a third heat exchanger having hot and cold sections, the cold section of said third heat exchanger receiving a portion of anode and cathode vent streams.

29. The fuel processor as in claim 27, wherein each of said first and second heat exchangers receive liquid water from an external source to generate a mixture of steam and water, said mixture being delivered to the HRSG.

30. The fuel processor as in claim 27, wherein the hot section of the second heat exchanger receives the output gas stream from the CO oxidizer.

31. The fuel processor as in claim 28, wherein said third heat exchanger further receives product gas from the reformer reactor operating in a regeneration step for preheating the anode and cathode vent streams, said vent stream being delivered to the reformer reactor in the regeneration step.

32. The fuel processor as in claim 27, wherein a portion of the anode and cathode vent streams are supplied to an auxiliary burner associated with the HRSG.

33. The fuel processor as in claim 32, wherein the auxiliary burner is supplied with ambient air.

34. In a fuel processor based on autothermal cyclic reforming process, said processor having two reformer reactors with integrated heat exchangers, said two reformer reactors cycling between a reforming step and a regeneration step, a method of generating hydrogen gas comprising:

receiving a mixture of fuel and steam in said reformer reactor operating in a reforming step, said fuel delivered from a fuel supply and said steam generated by a heat recovery steam generator (HRSG), to produce a hydrogen-rich reformate gas;

feeding the reformate gas to a shift reactor to reduce the concentration of carbon monoxide (CO) gas present in the reformate gas to produce shift reactor product gas;

receiving the shift reactor product gas in a condenser to recover heat from the shift reactor product gas; and supplying condenser output gas stream to a pressure swing adsorption (PSA) unit for generating high purity hydrogen.

35. The method as in claim 34, further comprising:

supplying a portion of unreacted gas stream from the PSA unit to the condenser for recovering heat from the unreacted gas stream; and delivering the unreacted gas stream from the condenser to the reformer reactor operating in the regeneration step.

36. The method as in claim 35, wherein the unreacted gas stream from the PSA unit and ambient air prior to its delivery to the condenser.

37. The method as in claim 34, further comprising:

supplying a portion of the unreacted gas stream from the PSA unit to an auxiliary burner associated with the HRSG.

38. The method as in claim 37, wherein the auxiliary burner is supplied with ambient air.

* * * * *

UNITED STATES PATENT AND TRADEMARK OFFICE
CERTIFICATE OF CORRECTION

PATENT NO. : 6,878,362 B2  Page 1 of 1
APPLICATION NO. : 10/116126
DATED : April 12, 2005
INVENTOR(S) : Kumar et al.

It is certified that error appears in the above-identified patent and that said Letters Patent is hereby corrected as shown below:

Column 1,
Line 5, before "BACKGROUND OF THE INVENTION" insert the following:
-- This invention was made with Government support under contract number DE-FC36-01AL67614 awarded by the Department Of Energy, The government has certain rights in this invention. --.

Signed and Sealed this

Eleventh Day of July, 2006

JON W. DUDAS
*Director of the United States Patent and Trademark Office*